Patented Nov. 4, 1947

2,430,332

UNITED STATES PATENT OFFICE 2,430,332

COMPOSITION AND METHOD

Hubert G. Guy, Pittsburgh, Pa., and Harry F. Dietz, Wilmington, Del., assignors to E. I. du Pont de Nemours & Company, Wilmington, Del., a corporation of Delaware No Drawing. Application March 30, 1945, Serial No. 585,798

4 Claims. (Cl. 167—45)

This invention relates to the control and destruction of weeds and the defoliation of crop plants by means of a new and effective herbicide. More particularly it relates to methods and compositions for destroying plants or parts of plants by exposing the foliage of the plant to a lethal concentration of a dimethyl cyanamidodithiocarbonate.

It has become a common practice in the art to effect control and destruction of weeds and to effect defoliation of crop plants by means of chemicals. Plant poisons such as ammonium sulfamate, sodium chlorate, sodium arsenate and sodium dinitro-ortho-cresylate have been used to kill weeds of annual, perennial, succulent or woody types, and to kill potato and onion foliage, to facilitate digging and to defoliate cotton to facilitate mechanical picking. More recently the plant regulant material, 2, 4-dichlorophenoxyacetic acid, has been used to kill plants. Under the influence of appropriate concentration, the growth processes of the plant appear to be so stimulated that the normal metabolism of the plant is upset and the plant dies.

An object of the invention is to provide new and effective herbicides. Another object of the invention is to provide a treatment which will bring about the partial or complete destruction of a plant in an effective and economical manner. Oher objects will appear as the description proceeds.

These objects are accomplished in the present invention by exposing the foliage of the plant to a lethal concentration of dimethyl cyanamidodithiocarbonate. Plants may be treated in accordance with the invention without the disadvantages characteristic of many herbicides such as corrosiveness, inflammability, high toxicity, high cost, lack of selectivity, and ineffectiveness toward certain plants. By the treatment of the invention, a new and effective weapon to supplement or replace known methods is provided. The new herbicides of the invention in suitable compositions in order to give a proper distribution of the phytocidal ingredient or ingredients over the surface of the foliage in a lethal concentration, may be used to control a large variety of weeds or to defoliate crop plants.

In the application of the phytocidal materials of the invention it is desirable to prepare concentrates which may be diluted with a convenient carrier such as water or a dust powder for application to the plant. Concentrated suspensions or solutions containing suitable dispersing agents may be used or the phytocidal material may be dispersed in a water-soluble solid along with a suitable dispersing agent. Such materials may be added to water to form dispersions of suitable concentration for application to the plant. Thus it is possible to incorporate the phytocidal agent in water-miscible solvents such as acetone, diacetone alcohol, methanol, and ethanol, or water-soluble solids such as sodium sulfate, ammonium sulfate, sodium carbonate, and dextrin, or with such dispersing agents as Goulac, Lenkanol, saponin, and glue.

In applying the phytocidal material as a dust it may be incorporated in one or more of such finely divided, inert substances as talc, pyrophyllite, various clays, fuller's earth, diatomaceous earth, etc., and like water-soluble and water-insoluble conditioning materials. In a proper state of subdivision alone or incorporated in a dusting powder these compositions may be dusted on the foliage with the usual dust applicators.

Water-dispersible powders may also be employed by incorporating the phytocidal material in a finely-divided, water-insoluble, inert substance such as those noted above, along with a wetting and dispersing agent such as sodium lauryl sulfate, petroleum oil sulfonates, alkyl naphthalene, sodium sulfonates, amino soaps, etc.

The various types of compositions may include other materials. Thus, in some cases it is desirable to include a hygroscopic agent such as calcium chloride, zinc chloride, glyceryl ammonium sulfate, glycerol, sorbitol, glucamine, glycol and diethylene glycol ethers, ammonium thiocyanate, polyvinyl alcohol, and other water-miscible organic substances of high molecular weight such as polyglycols, polyglycerols, (polyethanoxy) glycerols and their ether, ester, and amine derivatives, and, in general, substances of the character described in U. S. Patent 2,144,647 granted January 24, 1939, as well as substances of the character set forth in French Patent 845,388; wetting or dispersing agents such as sodium lauryl sulfate, sodium salts of alkyl naphthalene sulfonic acids, long-chain C- or N-substituted betaines, long-chain quaternary ammonium salts, salts of long-chain aliphatic secondary sulfonic acids such as those described in U. S. Patent 1,242,162, sodium salts of alkyl sulfonic acids derived from petroleum as described in U. S. Patent 2,197,800, and like wetting agents; and other phytocidal materials such as sulfuric acid, ammonium trichloracetate, ammonium sulfate, ammonium chloride, ferrous sulfate, copper sulfate, borax and other boron compounds, bisulfites, nitrophenols, such as 2, 4-dinitroortho-cresol sodium salt, other nitro compounds such as beta-nitrostyrene, furylnitroethylene, 2,6-dichloro-4-nitrophenol ureate, polychlorinated phenols and their alkali metal salts, coal tar distillates, and oil refinery residues.

It is an advantage also to include in these types of compositions a small amount of a plant regulant material or auxin as disclosed and defined in U. S. Patents 2,220,505, 2,129,598 through 2,129,601, 2,284,002, 2,297,904, 2,300,948, 2,303,192, 2,322,760, and 2,322,761, and other plant regulants or auxins of the same character. In the presence of such materials the effectiveness of the plant poison is substantially increased. Apparently the stimulation of the growth processes of the plants stimulates absorption and translocation of the poison. Thus by virtue of this combination, it is possible to effect economies and to effect control of plant species which have not heretofore been possible.

The amount of the phytocidal ingredient necessary to effect kill of the plant cannot be stated with certainty in view of the wide range of susceptibility of different plants to the material and the effect of the particular type of vehicle, and the effect of various modified agents such as have been fully disclosed. Generally speaking, however, application of the material from compositions containing 5 to 50 per cent of the phytocidal ingredient may be utilized satisfactorily.

The invention may be more fully understood by reference to the following examples in which the parts are by weight unless otherwise specified.

*Example 1*

2 parts of dimethyl cyanamidodithiocarbonate, 1 part Goulac and 2 parts water are milled together until the particle size is 2 microns. The dispersion is dried and mixed with 17 parts of sodium sulfate to give a 10% active ingredient composition and used at a concentration of 0.2 to 2.0% active ingredient basis.

*Example 2*

The dispersion prepared as in Example 1 is mixed with 17 parts of sodium sulfate and dried and used in the same way.

*Example 3*

1 part of dimethyl cyanamidodithiocarbonate and 1 part talc are mixed together and then comminuted to a particle size so that 90% will be 10 microns or below.

*Example 4*

1 part dimethyl cyanamidodithiocarbonate, 8.8 parts diacetone alcohol and 0.2 part Du Ponol G are mixed together to form a solution which on dilution with water will give a fine dispersion of active ingredient.

The compositions of the invention as illustrated in the examples are useful as general purpose herbicides for destroying the foliage of or for killing annual or perennial, succulent or woody plants, but are particularly useful for the control of broad-leaved weeds especially the succulent annuals, such as ragweeds, or for defoliating crop plants, such as soybeans and cotton.

While we have described our invention with reference to particular embodiments, it will be understood that variation may be made therein without departing from the nature and scope of the invention and that other active ingredients within the scope of the invention may be formulated in like manner as in the examples and that other adjuvants may be substituted or used in addition or supplemental to those of the examples, in accordance with the general instructions already set forth.

I claim:

1. The method which comprises exposing a plant to a lethal concentration of dimethyl cyanamidodithiocarbonate.

2. A herbicidal composition containing from 5 to 50 per cent of dimethyl cyanamidodithiocarbonate dispersed in a carrier.

3. A herbicidal composition containing dimethyl cyanamidodithiocarbonate, a hygroscopic material, and a diluent.

4. A herbicidal composition containing dimethyl cyanamidodithiocarbonate, a hygroscopic agent, a wetting agent and a diluent.

HUBERT G. GUY.
HARRY F. DIETZ.

REFERENCES CITED

The following references are of record in the file of this patent:

UNITED STATES PATENTS

| Number | Name | Date |
|---|---|---|
| 1,997,750 | Sanchelli | Apr. 16, 1935 |
| 2,173,236 | Offord | Sept. 19, 1939 |
| 2,269,397 | Osborne | Jan. 6, 1942 |